United States Patent [19]

Schäfer et al.

[11] Patent Number: 5,312,962

[45] Date of Patent: May 17, 1994

[54] PROCESS FOR THE PRODUCTION OF COMPOUNDS CONTAINING ALDIMINE OR KETIMINE GROUPS AND THE COMPOUNDS OBTAINED BY THIS PROCESS

[75] Inventors: Walter Schäfer, Leichlingen; Hanns-Peter Müller, Bergisch Gladbach, both of Fed. Rep. of Germany

[73] Assignee: Bayer Aktiengesellschaft, Leverkusen, Fed. Rep. of Germany

[21] Appl. No.: 908,137

[22] Filed: Jul. 2, 1992

[30] Foreign Application Priority Data

Jul. 10, 1991 [DE] Fed. Rep. of Germany ....... 4122766

[51] Int. Cl.$^5$ .................. C07C 251/20; C07C 251/08; C08G 12/00
[52] U.S. Cl. ..................... 560/121; 528/228; 528/229; 560/35; 560/125; 560/168
[58] Field of Search ................ 560/35, 121, 125, 168; 528/228, 229

[56] References Cited

U.S. PATENT DOCUMENTS

| | | | |
|---|---|---|---|
| 3,420,800 | 1/1969 | Haggis | 260/75 |
| 3,567,692 | 3/1971 | Haggis et al. | 260/75 |
| 3,668,183 | 6/1972 | Hoy et al. | 260/65 |
| 3,715,338 | 2/1973 | Schmelzer et al. | 260/77.5 AM |
| 4,904,740 | 2/1990 | Blum et al. | 525/327.3 |
| 4,937,293 | 6/1990 | Blum et al. | 525/327.6 |

FOREIGN PATENT DOCUMENTS 122453 10/1984 European Pat. Off. .
240083 10/1987 European Pat. Off. .

*Primary Examiner*—Allen J. Robinson
*Assistant Examiner*—Peter G. O'Sullivan
*Attorney, Agent, or Firm*—Joseph C. Gil; Thomas W. Roy

[57] ABSTRACT

The invention relates to a process for the production of organic compounds containing aldimine or ketimine groups by the reaction of compounds containing β-ketoester groups with bis-aldimines or bis-ketimines with elimination of aldehyde or ketone and to the preferred compounds obtained by this process.

1 Claim, No Drawings

PROCESS FOR THE PRODUCTION OF COMPOUNDS CONTAINING ALDIMINE OR KETIMINE GROUPS AND THE COMPOUNDS OBTAINED BY THIS PROCESS

BACKGROUND OF THE INVENTION

1. Field of the Invention

This invention relates to a process for the production of compounds containing aldimine or ketimine groups by reacting compounds containing $\beta$-ketoester groups with bis-aldimines or bis-ketimines with partial elimination of the aldehydes or ketones on which these compounds are based and to the preferred compounds containing ketimine groups obtained by this process.

2. Description of the Prior Art

Organic polyamines present in the form of aldimines or ketimines are valuable, potential reactants, which may be activated by heat and/or moisture, for organic polyisocyanates, polyanhydrides or polyepoxides in the production of plastics based on these starting materials (see, for example, DE-OS 1,520,139, DE-OS 1,719,121, DE-OS 3,710,963 or DE-OS 3,742,123).

To produce these blocked amines, primary amines are reacted with aldehydes or ketones by heating to temperatures above 60° C.

Amines containing centers reactive to amino groups at elevated temperature, for example amines containing ester or carbonate groups, are not readily suitable as starting materials for this process because secondary reactions may take place. In addition, to convert the polyester, polyether or polycarbonate polyols known from polyurethane chemistry into the corresponding aldimine- or ketimine-terminated terminated derivatives by the old method, the terminal hydroxyl groups first have to be converted into primary amino groups by complicated methods.

A simple, universal process for the production of compounds containing aldimine or ketimine groups has now been found, in which compounds containing $\beta$-ketoester groups are reacted with bis-aldimines or bis-ketimines in the presence of a catalytic quantity of water at comparatively low reaction temperatures in accordance with the following reaction scheme:

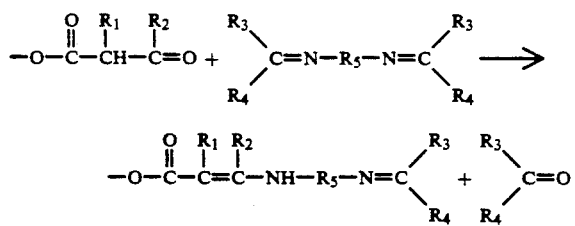

In the less preferred use of aldimines as reactants for the $\beta$-ketoesters, the substituent $R_3$ is of course hydrogen.

Although the reaction between compounds containing $\beta$-ketoester groups and bis-aldimines or bis-ketimines is known from U.S. Pat. No. 3,668,183, this patent is concerned with the production of adhesives using substantially equivalent quantities of the starting materials. It had not been expected that the reaction of the above-mentioned starting materials in accordance with the invention in a molar ratio of aldimine or ketimine groups to ketoester groups of approx. 2:1 would take place in the substantial absence of chain-extending or crosslinking reactions and would provide reaction products which have a distinctly lower viscosity than corresponding ketimine-terminated compounds obtained by the reaction of the corresponding polyamino compounds with ketones.

SUMMARY OF THE INVENTION

The present invention relates to a process for the production of organic compounds containing aldimine or ketimine groups by reacting organic compounds containing $\beta$-ketoester groups with 0.75 to 1.0 mole per mole of ketoester groups of a bis-aldimine or bis-ketimine at temperatures of 0° to 80° C. in the presence of a catalytic quantity of water with elimination of aldehyde or ketone in a quantity equivalent to the quantity of ketoester groups reacted.

The present invention also relates to the preferred ketimine-terminated compounds obtained by this process which correspond to formula III:

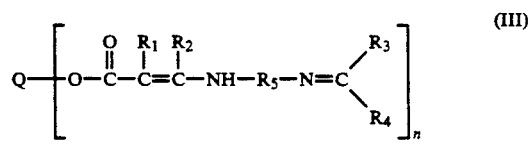

wherein

Q is an n-functional residue obtained by removing the hydroxyl groups from an n-functional hydroxyl compound containing primary and/or secondary hydroxyl groups and having a molecular weight ($M_n$) of 62 to 15,000, $R_1$ is hydrogen or is attached to $R_2$ by a C—C bond and, with $R_2$, forms a tri- or tetramethylene group, $R_2$ is a methyl or ethyl group or is attached to $R_1$ by a C—C bond and, with $R_1$, forms a tri- or tetramethylene group, $R_3$ is a $C_{1-9}$ alkyl group or a cyclohexyl group or, together with the carbon atom and the substituent $R_4$, forms a cycloaliphatic ring containing 5 or 6 ring members, $R_4$ is a $C_{1-9}$ alkyl group or a cyclohexyl group or, together with the carbon atom and the substituent $R_3$, forms a cycloaliphatic ring containing 5 or 6 ring members, $R_5$ is a (cyclo)aliphatic $C_{2-15}$ hydrocarbon radical and n is a number from 2 to 15.

DETAILED DESCRIPTION OF THE INVENTION

The starting compounds for the process according to the invention include organic compounds containing at least two $\beta$-ketoester groups and bis-aldimines or bis-ketimines, preferably bis-ketimines, of the type described in more detail hereinafter.

The compounds containing $\beta$-ketoester groups are based on the polyhydroxyl compounds known from polyurethane chemistry. These polyhydroxyl compounds are converted into the starting materials containing $\beta$-ketoester groups by known methods, for example, by reaction with diketene or an acetoactic ester (see, e.g., U.S. Pat. No. 3,668,183) or by a corresponding reaction with cyclopentan-2-one or cyclo-hexan-2-one carboxylic acid esters of simple alcohols, such as ethanol.

All of these reactions are preferably carried out by heating the polyhydroxyl compound used as starting material with the reactants mentioned by way of example to approximately 100° to 200° C. in a molar ratio of hydroxyl groups to reactant of 1:1 to 1:1.5. When esters are used as the "reactant," the completion of the reaction is indicated when alcohol is no longer given off. The reaction may be carried out in bulk or in the presence of solvents, such as benzene or toluene.

Polyhydric alcohols having a molecular weight of 62 to 15,000 and containing 2 to 15 primary or secondary alcoholic hydroxyl groups may be used for the production of the compounds containing β-ketoester groups used as starting material in the process according to the invention.

Examples of such polyhydric alcohols are polyhydric alcohols having a molecular weight of 62 to 200, such as ethylene glycol, propylene glycol, trimethylol propane, pentaerythritol, diethylene glycol, dipropylene glycol, triethylene glycol or tripropylene glycol.

Polyhydroxypolyethers containing 2 to 6, preferably 2 to 3, primary or secondary hydroxyl groups per molecule and having a molecular weight ($M_n$) of 200 to 15,000, preferably 250 to 10,000 and more preferably 1,500 to 6,000 are also suitable. Polyether polyols such as these are obtained in known manner by the alkoxylation of suitable starter molecules. Ethylene oxide and/or propylene oxide are preferably used for the alkoxylation reaction, optionally in the form of a mixture or successively. Suitable starter molecules include the polyhydric alcohols previously mentioned and also amines containing at least 2 NH bonds, such as ethylene diamine. Sucrose polyethers, for example, those described in DE-AS 1,176,358 and 1,064.938, may also be used in accordance with the invention. Polyethers modified by vinyl polymers which can be obtained, for example, by the polymerization of styrene and acrylonitrile in the presence of polyethers (U.S. Pat. Nos. 3,383,351, 3,304,273, 3,523,093, 3,110,695 and DE-PS 1,152,536) are also suitable, as are OH-functional polybutadienes.

The polyhydroxypolyesters known in polyurethane chemistry containing 2 to 6 hydroxyl groups and having a molecular weight $M_n$ of 150 to 15,000, preferably 150 to 10,000 and more preferably 1,500 to 6,000, may also be used for the production of the compounds containing β-ketoester groups. These polyhydroxypolyesters are reaction products of excess quantities of dihydric and, optionally, trihydric low molecular weight alcohols of the type previously mentioned with polybasic, preferably dibasic, carboxylic acids. Instead of the free polycarboxylic acids, the corresponding polycarboxylic anhydrides or corresponding polycarboxylic acid esters of lower alcohols or mixtures thereof may be used for the production of the polyesters. The polycarboxylic acids may be aliphatic, cycloaliphatic, aromatic and/or heterocyclic and may optionally contain halogen atoms and/or may be unsaturated. Examples of such polycarboxylic acids are succinic acid, adipic acid, azelaic acid, sebacic acid, phthalic acid, isophthalic acid, trimellitic acid, phthalic anhydride, tetrahydrophthalic anhydride, hexahydrophthalic anhydride, endomethylene tetrahydrophthalic anhydride, glutaric anhydride, maleic acid, maleic anhydride, fumaric acid, terephthalic acid dimethyl ester and terephthalic acid bis-glycol ester. Polyesters based on lactones, such as ε-caprolactone, or hydroxycarboxylic acids, such as ω-hydroxycaproic acids, may also be used.

Also suitable are polycarbonate diols having a molecular weight ($M_n$) of 200 to 15,000, preferably 200 to 10,000 and more preferably 1,500 to 6,000. These diols may be obtained, for example, by the reaction of diols, such as propane-1,3-diol, butane-1,4-diol, hexane-1,6-diol, diethylene glycol, triethylene glycol and/or tetraethylene glycol, with phosgene or diaryl carbonates, such as diphenyl carbonate.

Other preferred polyhydroxyl compounds are polyhydroxypolyacrylates having a molecular weight ($M_n$) of 1,000 to 15,000, preferably 3,000 to 12,000, and containing 1 to 10% by weight of hydroxyl groups which approximately corresponds to a functionality of 2 to 15, preferably 3 to 12. These compounds are produced in known manner by the copolymerization of olefinically unsaturated monomers at least a portion of which are olefinically unsaturated monomers containing hydroxyl groups. Suitable monomers include styrene and/or alkyl acrylates and/or methacrylates containing 1 to 6 carbon atoms in the alkyl component, such as methyl acrylate, methyl methacrylate, ethyl acrylate, ethyl methacrylate, n-butyl acrylate and n-hexyl methacrylate. Suitable hydroxyfunctional monomers include hydroxyalkyl esters of acrylic or methacrylic acid containing 2 to 6 carbon atoms in the hydroxyalkyl component, such as hydroxyethyl, 2-hydroxypropyl, 3-hydroxypropyl, 4-hydroxybutyl and 6-hydroxyhexyl acrylate or methacrylate.

The molecular weight of the polyether polyols and the polycarbonate diols may readily be calculated from the hydroxyl group content and the functionality. The molecular weight of the polyester polyols and the polyacrylate polyols may be determined by vapor pressure osmometry.

The preferred compounds containing n-ketoester groups to be used in the process according to the invention correspond to formula I:

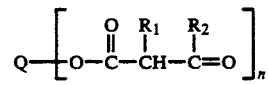

wherein

Q, $R_1$, $R_2$ and n are as previously defined.

The aldimines or ketimines to be used in the process according to the invention are reaction products of ketones or aldehydes with primary diamines which are prepared as described, for example, in U.S. Pat. No. 3,668,183 or U.S. Pat. No. 4,513,112. The bis-ketimines are preferred to the bis-aldimines.

Preferred ketones include acetone, methyl ethyl ketone, methyl n-propyl ketone, diethyl ketone, methyl n-amyl ketone, diisobutyl ketone, methyl t-butyl ketone, methyl n-heptyl ketone, cyclopentanone and cyclohexanone.

Suitable aldehydes for the production of the bis-aldimines include acetaldehyde, propionaldehyde, n-butyraldehyde, isobutyraldehyde, n-valeraldehyde, isovaleraldehyde, caproic aldehyde, heptanal, 3-formyl heptane or formyl cyclohexane.

Preferred diamines include ethylenediamine, hexamethylene- diamine, 1,4-diaminocyclohexane, 4,4'-diamino-dicyclohexyl methane, 1-amino-3,3,5-trimethyl-5-aminomethyl cyclohexane. Also suitable though less preferred are low molecular weight aminopolyethers such as the amination products of triethylene glycol or tripropylene glycol. Araliphatic diamines, such as 1,4-xylylenediamine, are also suitable, but less preferred.

Bis-ketimines corresponding to formula II

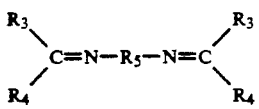

wherein $R_3$ to $R_5$ are as already defined, are preferred for the process according to the invention.

In the process according to the invention, the compounds containing β-ketoester groups and the aldimines or ketimines are reacted with one another in amounts such that for every β-ketoester group, there are 1.5 to 2, preferably 2 aldimine or ketimine groups, i.e., the molar ratio of β-ketoester groups to bis-aldimines or bisketimines is 1:0.75 to 1:1, preferably 1:1. The reaction takes place in the presence of a catalytic quantity of water, preferably a quantity of 0.005 to 0.1 moles of water per mole of β-ketoester groups. The reaction temperature is 0° to 80° C., preferably 10° to 50° C. The reaction can be followed by IR spectroscopy from the loss of intensity of the bands at approx. 1750 and 1720 cm$^{-1}$ (β-ketoester band) and the growth of the band at approx. 1610 cm$^{-1}$ (ester enamine band).

The reaction according to the invention may be carried out in the presence of suitable solvents, such as toluene or xylene. After the reaction, the reaction mixture is freed from volatile constituents (for example, solvent and carbonyl compounds eliminated) by distillation, preferably under vacuum.

The content in the end products of blocked amino groups in the form of aldimine or ketimine groups may be analytically determined by unblocking with water, reaction of the amine released with an excess of isocyanate, for example cyclohexyl isocyanate, and subsequent determination of the diisocyanate excess by known methods.

The compounds produced by the process according to the invention containing aldimine or ketimine groups attached by enamine groups are valuable potential water-activatable or moisture-activatable crosslinking components for plastics precursors containing isocyanate or carboxylic anhydride groups, preferably as binders for coating compositions. The coating compositions are suitable for coating substrates by standard coating processes.

The invention is further illustrated but is not intended to be limited by the following examples in which all parts and percentages are by weight unless otherwise specified.

EXAMPLES

Example 1

62.5 g (0.056 moles OH) of a branched terephthalate polyester (prepared from 269 parts by weight terephthalic acid, 147 parts by weight neopentyl glycol, 21 parts by weight hexane-1,6-diol and 18 parts by weight trimethylol propane) were dissolved in 62.5 g xylene. After the addition of 9.72 g (0.061 moles) tert. butyl acetoacetate, the resulting solution was stirred for 3 hours at 130° C. with tert. butanol and a portion of the xylene being distilled off. The reaction product was then freed from tert. butanol and solvent over a period of 30 minutes at 140° C./0.1 mbar. 120 ml xylene were added to the product with stirring at around 125° C., after which the product was left to cool to room temperature. To prepare the polyketimine, 15.6 g (0.056 moles) of the bis-ketimine based on 1-amino-3,3,5-trimethyl-5-aminomethyl cyclohexane (IPDA) and methyl ethyl ketone were introduced into the reaction solution together with 0.07 g water, followed by stirring for 0.5 hour at 50° C. The solution of the polyketimine had a solids content of 45.8% by weight. After saponification with water, an amine content of 0.065 moles per 100 g solids was determined by titration.

Example 2

125 g (0.125 moles OH) polypropylene glycol, molecular weight 2,000, and 25 g (0.158 moles) tert. butyl acetoacetate were heated for 1 hour with stirring to 140° C. with distillation of tert. butanol. The reaction product was then freed from residual tert. butanol and excess tert. butyl acetoacetate at 140° C./0.1 mbar.

34.75 g (0.125 moles) of the bis-ketimine based on IPDA and methyl ethyl ketone were introduced into the reaction mixture together with 0.05 g water, followed by stirring for 30 minutes at 50° C. The formation of enamine groups was reflected in the disappearance of the β-ketoester band at 1,750 cm$^{-1}$.

The reaction mixture was then freed from all volatile constituents under a vacuum of 0.1 mbar and at a temperature of 100° C. The reaction product accumulating as residue had a viscosity at 25° C. of 800 mPa.s. After saponification with water, an amine content of 0.05 moles per 100 g of the ketimine compound was determined by titration.

Comparison Example 125 g (0.125 moles OH) polypropylene glycol, molecular weight 2,000, and 25 g (0.158 moles) tert. butyl acetoacetate were heated for 1 hour with stirring to 140° C. with distillation of tert. butanol, The reaction product was then freed from residual tert. butanol and excess tert. butyl acetoacetate at 140° C./0.1 mbar. 21.2 g (0.125 moles) IPDA were introduced into the reaction mixture together with 100 ml toluene, followed by stirring for 30 minutes at 50° C. 45 g (0.625 moles) methyl ethyl ketone were then added, after which the product was dried over zeolite for 6 hours under reflux. Concentration at 100° C./0.1 mbar resulted in a product having a viscosity at 25° C. of 2,000 mPa.s.

Example 3

125 g (0.125 moles OH) polypropylene glycol, molecular weight 2,000, and 25 g (0.158 moles) tert. butyl acetoacetate were heated with stirring for 1 hour to 140° C. with distillation of tert. butanol. The reaction product was then freed from residual tert. butanol and excess tert. butyl acetoacetate at 140° C./0.1 mbar.

28 g (0.125 moles) of the bis-ketimine based on hexamethylenediamine and methyl ethyl ketone were introduced into the reaction mixture together with 0.05 g water, followed by stirring for 30 minutes at 50° C. The formation of enamine groups was reflected in the disappearance of the β-ketoester band at 1750 cm$^{-1}$. After saponification with water, an amine content of 0.05 moles per 100 g of the ketimine compound was determined by titration.

Example 4

25 g (0.187 moles) anhydrous trimethylol propane and 93.7 g (0.593 moles) tert. butyl acetoacetate were heated for 1 hour with stirring to 140° C. with distillation of tert. butanol. The reaction product was subsequently freed from residual tert. butanol and excess tert. butyl acetoacetate at 140° C./0.1 mbar. 155.62 g (0.56 moles) of the bis-ketimine based on IPDA and methyl ethyl ketone were added and the reaction mixture was stirred for 30 minutes at 50° C. together with 0.05 g water. Enamine groups were formed. After saponification with water, an amine content of 0.24 moles per 100 g polyketimine was determined by titration.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An organic compound containing aldimine or ketimine groups which corresponds to the formula

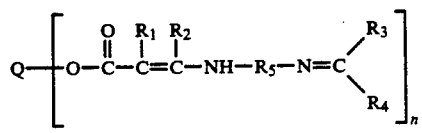

and is prepared by a process which comprises reacting an organic compound containing β-ketoester groups and corresponding to the formula

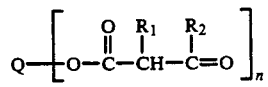

with 0.75 to 1.0 mole, per mole of ketoester groups, of a bis-aldimine or bis-ketimine corresponding to the formula

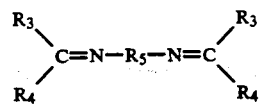

wherein
Q is an n-functional residue obtained by removing the hydroxyl groups from an n-functional polyhydroxyl compound containing primary and/or secondary hydroxyl groups and having a molecular weight of 62 to 15,000,
$R_1$ is hydrogen or is attached to $R_2$ by a C—C bond and with $R_2$ forms a tri- or tetramethylene group,
$R_2$ is a methyl or ethyl group or is attached to $R_1$ by a C—C bond and with $R_1$ forms a tri- or tetramethylene group,
$R_3$ is a $C_{1-9}$ alkyl radical or, together with the carbon atom and the substituent $R_4$, forms a cycloaliphatic ring containing 5 or 6 ring members,
$R_4$ is a $C_{1-9}$ alkyl radical or, together with the carbon atom and the substituent $R_3$, forms a cycloaliphatic ring containing 5 or 6 ring members,
$R_5$ is a (cyclo)aliphatic $C_{2-15}$ hydrocarbon radical and n is a number from 2 to 15,
at a temperature of 0° to 80° C. in the presence of a catalytic quantity of water with elimination of aldehyde or ketone in a quantity equivalent to the quantity of ketoester groups.

* * * * *